United States Patent [19]
Fremund

[11] Patent Number: 5,794,894
[45] Date of Patent: Aug. 18, 1998

[54] SELECTIVELY ADJUSTABLE SUSPENSION SUPPORT

[75] Inventor: Zdenek A. Fremund, Wayne, N.J.

[73] Assignee: Carl Stahl Sava Industries, Inc., Riverdale, N.J.

[21] Appl. No.: 822,466

[22] Filed: Mar. 21, 1997

[51] Int. Cl.⁶ ..................................... F16L 3/00
[52] U.S. Cl. .................. 248/53; 24/116 A; 248/59; 248/327
[58] Field of Search ................. 248/53, 58, 60, 248/75, 327, 328; 24/116 A, 128, 115 R

[56] References Cited

U.S. PATENT DOCUMENTS

| | | |
|---|---|---|
| 620,170 | 2/1899 | Peppard . |
| 918,021 | 4/1909 | Donovan ................... 248/60 |
| 964,352 | 7/1910 | Wheeler . |
| 1,086,442 | 2/1914 | Cornelius . |
| 1,261,036 | 4/1918 | Kerns . |
| 1,804,472 | 5/1931 | Leslie .................... 248/60 X |
| 1,906,707 | 5/1933 | Morgan et al. . |
| 2,542,172 | 2/1951 | Wold ..................... 248/60 X |
| 2,707,607 | 5/1955 | O'Connor .................. 248/60 |
| 3,172,178 | 3/1965 | Copell . |
| 3,422,964 | 1/1969 | Nadherny . |
| 3,592,425 | 7/1971 | Randolph et al. . |
| 3,784,030 | 1/1974 | Chierici . |
| 4,519,564 | 5/1985 | Nadherny . |
| 4,986,500 | 1/1991 | Campbell ................... 248/53 |
| 4,988,070 | 1/1991 | Hollinger et al. . |
| 5,388,864 | 2/1995 | Kozinski . |
| 5,522,571 | 6/1996 | Simmons .................. 248/60 X |

Primary Examiner—Derek J. Berger
Attorney, Agent, or Firm—Arthur Jacob

[57] ABSTRACT

A selectively adjustable suspension support and a method for suspending a supported member from an overhead support member at a selected distance below the overhead support member includes an elongate flexible cable, a bead affixed to the cable adjacent each end of the cable, and a plurality of separate, discrete tabs affixed to the cable, spaced apart along the length of the cable, each tab including a catch for receiving and capturing a bead in the tab, whereby capture of a bead within a selected tab establishes the distance between the overhead support member and the supported member, and juxtaposition of the cable with the catch precludes inadvertent release of the bead from the catch.

20 Claims, 1 Drawing Sheet

U.S. Patent  Aug. 18, 1998  5,794,894
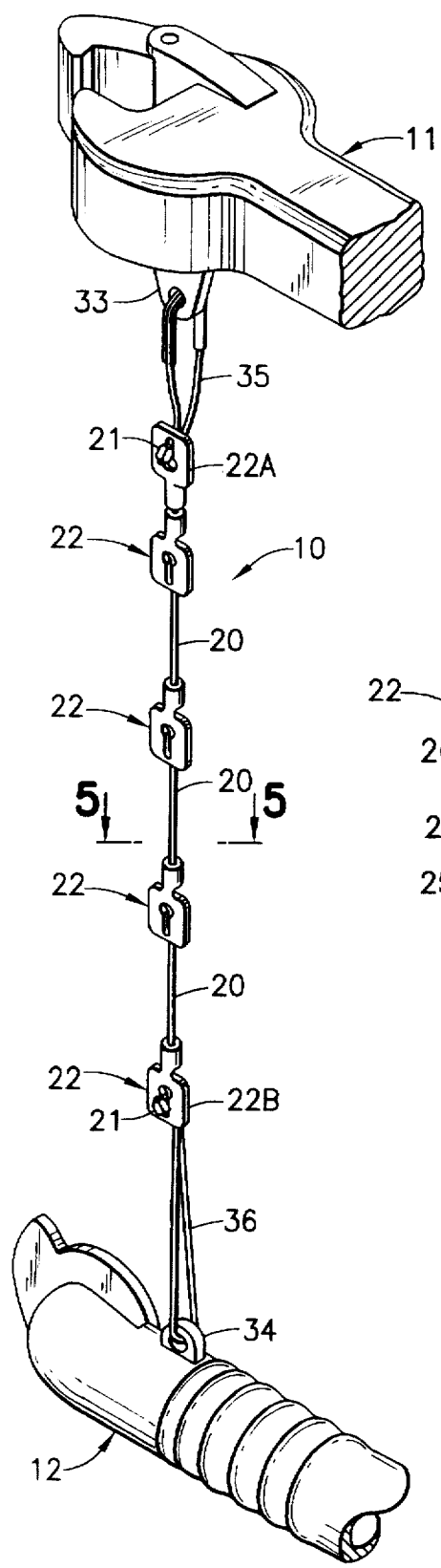
FIG. 1
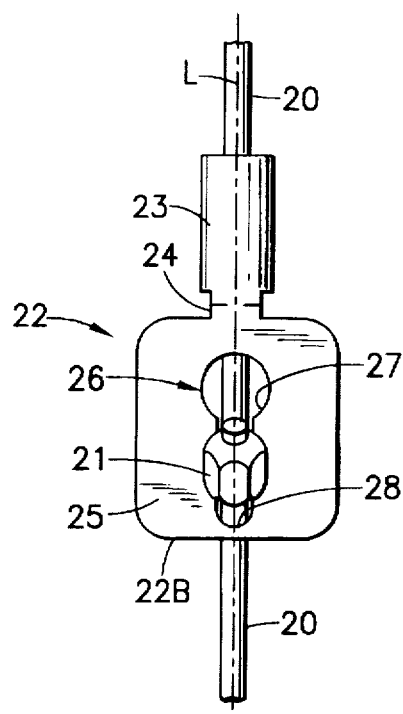
FIG. 3
FIG. 2
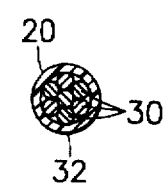
FIG. 5
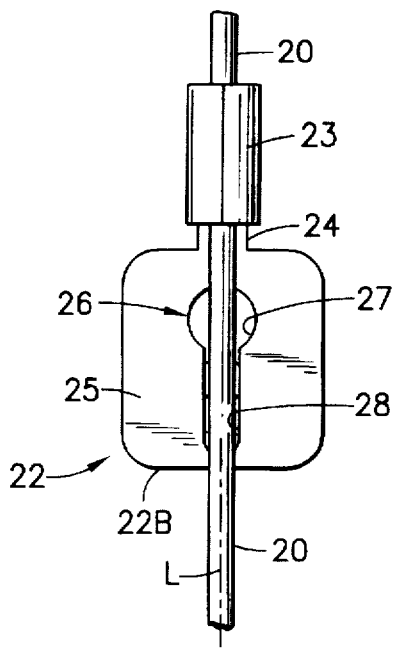
FIG. 4

SELECTIVELY ADJUSTABLE SUSPENSION SUPPORT

The present invention relates generally to an improved adjustable support assembly and pertains, more specifically, to a selectively adjustable support assembly for supporting a supported member, such as a railroad brake hose coupler or other device in similar need of support, where the adjustable support is easy to use, and both relatively taut and highly reliable once adjusted and secured in place. More particularly, the present invention is a selectively adjustable suspension support suitable for suspending members at a selected distance from a support member, such as in the suspension of flexible brake hoses and corresponding coupling members from railway cars so as to prevent the coupling members from hanging too low or dragging on the ground.

In numerous application, various devices have been used to securely attach, support, and suspend a supported member from an overhead, fixed support member. One such application is used in the coupling of railroad cars in the railroad industry. Specifically, railroad cars are coupled together in long chains wherein one central braking system is used to stop the entire chain of railroad cars. The one braking system therefore must be connected from car to car when the cars are coupled together. As is well known in the art, this coupling occurs using brake hose couplers such as those disclosed in U.S. Pat. No. 5,388,864. As also well known in the art, these brake coupling members extend outward in a cantilevered fashion from each end of each railroad car. The flexible hoses and brake coupling members are fixed in length but retain some freedom of movement in order to facilitate connection to an adjacent brake coupling member on an adjacent car, as is well known in the art and described in the above-referenced patent.

Each brake hose coupling member requires a support assembly to securely suspend the cantilevered end thereof from the respective railroad car. One device which has been used in the past to provide such suspension is a flexible band or cable that extends from a rigid section of the railroad car to a boss or other connector on the railroad brake coupling member. However, it has been found over time that these flexible bands or cables which often were manufactured of rubber or plastic, would elastically elongate or break whereby, in either case, the coupling member would no longer be supported sufficiently to maintain a minimum of four inches above the ground, or above the railroad tracks, as is required by federal law. Furthermore, in the worst case scenario, the elastic elongation or breaking of the flexible band or cable would result in the actual dragging of the railroad brake coupling member on the ground, thereby damaging or destroying the member, resulting in either damage to an uncoupled member such that it could not be coupled to an adjacent coupling member, or damage to, disconnecting of, or unsealing of two coupled members.

A further disadvantage of such flexible and typically slightly elastic bands or cables is the inability to adjust the hose or cable to a different length as is needed to keep the railroad brake hose coupling member a sufficient height above the ground. Specifically, all railroad cars are not alike and therefore the preferential distance between the railroad brake hose coupling member and the point on the railroad car from which it is suspended is not constant and thus some adjustability is needed within the suspension device.

Because of the above-outlined disadvantages, various more rigid support assemblies have been designed. For example, a suspension chain with a quick-connect means is used to suspend the railroad brake hose couplers from a railroad car as described in U.S. Pat. No. 3,422,964.

Another prior device for suspending a railroad brake hose coupler from a railroad car is disclosed in U.S. Pat. No. 4,519,564, as an adjustable support assembly. This adjustable support assembly includes a pair of inelastic yet flexible cables which are secured together at numerous spaced apart locations by retaining members rigidly secured in place in order to form a joint around the cables such that a series of elongated eyes are formed between the retaining members. One of the cables extends beyond the other cable or cables at each end thereof and includes a bullet member with a tapered leading end which is suitable for facilitating passage of the bullet member through one of the elongated eyes during locking. In operation, the adjustable support assembly is secured to a rigid support and the article is suspended in a substantially identical manner, that is, by passing or wrapping the cable through or around a boss or other support and extending the bullet member through one of the elongated eyes such that the bullet member is wedged in the eye.

These various support assemblies often are difficult to use and even more difficult to adjust or disengage once initially engaged, as may be required to adjust the height of the railroad brake hose coupler from the ground. Furthermore, if for any reason, either initially after manufacture or use, one of the cables is substantially more taut than the other, then the elongated eye will not be sufficiently slim to assure that the bullet member remains in the eye. Thus one side of the eye may become loose and the support assembly may fail to support the railroad brake hose coupler. The use of multiple cables adds significantly to the cost of these prior devices. Furthermore, it has been found that whenever one cable must be inserted through or around other cables, such as in the case of where the bullet member is inserted through the elongated eye as in the aforesaid U.S. Pat. No. 4,519,564, the cables will fray and may break due to prolonged rubbing and wear against one another.

The present invention provides an adjustable suspension support which overcomes the shortcomings outlined above and attains several objects and advantages, some of which are summarized as follows: Provides an improved support for suspending one member from another, such as a coupling member from a railroad car; provides an improved support for suspending a cantilevered member from a rigid member, such as a coupling member from a railroad car; provides an improved adjustable brake hose coupling support for use with railroad cars; provides an adjustable support for use in suspending a suspended member, such as a railroad brake hose coupler and hose, from an overhead support member, such as a railroad car, which is easy to install and use; provides an improved adjustable railroad brake hose coupling member support of improved endurance and securement reliability; provides an improved adjustable railroad brake hose coupling member support designed to avoid cable wear, fray and breaking; provides an easily adjustable improved suspension support, such as a railroad brake hose coupling member support; provides an improved adjustable railroad brake hose coupling member that reduces or eliminates bounce of the coupling member; and provides an improved suspension support which precludes inadvertent adjustment or disconnection of the support.

The above objects and advantages, as well as further objects and advantages, are attained by the present invention which may be described briefly as a selectively adjustable suspension support for suspending a supported member from an overhead support member at a selected distance below the overhead support member, the adjustable suspension support comprising: an elongate flexible suspension member having a longitudinal length extending between a first end and a second end; a retainer affixed to the suspension member adjacent each of the first end and the second end; and a plurality of separate, discrete receivers affixed to the suspension member, spaced apart along the length of the suspension member, each receiver including a catch for receiving and capturing a retainer in the receiver, whereby capture of a retainer within a selected receiver establishes the distance between the overhead support member and the supported member.

Further, the invention includes a method of suspending a supported member from an overhead support member at a selected distance below the overhead support member, utilizing an elongate flexible cable having a length extending longitudinally between opposite ends, a bead affixed to the cable adjacent each of the opposite ends, and a plurality of separate, discrete tabs affixed to the cable, spaced apart along the length of the cable, each tab including an aperture and a slot communicating with the aperture, the method comprising: passing a bead and a first portion of the cable adjacent the bead through the aperture of a selected tab by longitudinal movement of the first portion of the cable through the aperture; moving the first portion of the cable laterally from the aperture into the slot communicating with the aperture such that the first portion of the cable extends through the slot; the relative dimensions of the aperture, the slot, the first portion of the cable and the bead being such that the bead and the first portion of the cable pass through the aperture upon longitudinal movement of the first portion of the cable during reception of the bead into the opening, the first portion of the cable is received within the slot upon subsequent lateral movement of the first portion of the cable from the aperture into the slot, and the bead is precluded from passing longitudinally through the slot upon the reception of the first portion of the cable in the slot for precluding inadvertent release of the bead from the opening when the supported member is suspended from the overhead support member; and juxtaposing a further portion of the cable with the slot through which the first portion of the cable extends to deter inadvertent movement of the first portion of the cable laterally back into the aperture.

The invention will be understood more fully, while still further objects and advantages will become apparent, in the following detailed description of a preferred embodiment of the invention illustrated in the accompanying drawing, in which:

FIG. 1 is a perspective view of an adjustable suspension support constructed in accordance with the present invention and shown in the form of a railroad brake hose coupling support extending from a rigid overhead portion of a railroad car to a flexible and suspended railroad brake hose coupler;

FIG. 2 is a front fragmentary elevational view of a portion of the support;

FIG. 3 is a front fragmentary elevational view of the support, with the support end in an adjusted, secured position;

FIG. 4 is a rear fragmentary elevational view of the support, with the support end in an adjusted, secured position; and FIG. 5 is an enlarged cross-sectional view taken along line 5—5 of FIG. 1.

Similar reference characters refer to similar component parts throughout the drawing.

Referring now to the drawing, an improved adjustable suspension support constructed in accordance with the present invention is illustrated generally at 10 and is shown in the form of a railroad brake hose coupling member support, best seen overall in its environment in FIG. 1. Adjustable suspension support 10 may be used in a wide variety of applications where a supported member is suspended from an overhead support, including as a support and suspension member for a railroad brake hose coupling member cantilevered from a railroad car. In general, adjustable suspension support 10 is shown in FIG. 1 extending from an overhead, rigid support 11 on a railroad car (not shown) to a railroad brake hose coupling member 12 which extends from the railroad car. Adjustable suspension support 10 prevents railroad brake hose coupling member 12 from dragging on the ground during operation as the coupling member extends outward from the railroad car, and further assures that railroad brake hose coupling member 12 remains at least a minimum of four inches above the ground, as required by federal law.

Adjustable suspension support 10 includes an elongate suspension member in the form of a flexible, essentially inextensible cable 20 extending longitudinally along a longitudinal axis L. A retainer in the form of a bead 21 is secured to each end of cable 20, as by crimping or otherwise permanently affixing the bead 21 to the cable 20. A plurality of separate, discrete receivers 22 are spaced apart along cable 20, each receiver 22 being capable of selectively receiving and capturing one of the beads 21, as will be described in detail below. Receivers 22 each include a cable engaging connector shown in the form of a ferrule 23 connected by means of a neck 24 to a tab 25. Each tab 25 includes a catch in the form of a keyhole-shaped opening 26 having an insertion portion in the form of a generally circular, larger aperture 27 and a securement portion in the form of an elongate, smaller slot 28 extending from and communicating with the aperture 27.

One of the receivers 22, which is the uppermost receiver identified in FIG. 1 as receiver 22A located adjacent the upper end of cable 20, is inverted, or reversed, with respect to the remaining receivers 22; that is, the tab 25 of receiver 22A extends longitudinally from the corresponding ferrule 23 in a direction opposite to the direction in which the tab 25 of the lowermost receiver 22B at the lower end of the cable 20 extends from the corresponding ferrule 23, and the direction in which the tabs 25 of the intermediate receivers 22, located between the uppermost receiver 22A and the lowermost receiver 22B, extend. Thus, the orientation of receiver 22A orients the corresponding opening 26 in the tab 25 of receiver 22A such that the slot 28 extends from the aperture 27 toward the upper end of the cable 20, the orientation of receiver 22B orients the corresponding opening 26 in the tab 25 of receiver 22B such that the slot 28 extends from the aperture 27 toward the lower end of the cable 20, and each of the receivers 22 located between the uppermost receiver 22A and the lowermost receiver 22B are oriented such that the slot 28 of each corresponding opening 26 extends from the aperture 27 of the opening 26 toward the lower end of the cable 20, and the corresponding lower end of the adjustable suspension support 10.

Cable 20 preferably is constructed of a stranded, spiral wound metal cable having strands 30, such as steel strands, as seen in FIG. 5, and covered with a coating of synthetic polymeric material, such as PVC, shown in the form of a jacket 32 on the cable 20. In operation, the first, or upper end of cable 20 is attached to rigid overhead support 11, such as via a boss 33. More specifically, the upper end of cable 20, which is the end with receiver 22A, is looped through the boss 33, forming an upper loop 35 in the cable 20, and bead 21 is inserted longitudinally through opening 26 in tab 25 of receiver 22A. After such longitudinal insertion, cable 20 is pulled taut, away from rigid overhead support 11. Such pulling on the cable 20 causes the portion of the cable 20 adjacent to corresponding bead 21 to slide laterally out of circular aperture 27 of opening 26 and into elongate slot 28 communicating with aperture 27, whereby bead 21 tightly engages a portion of the tab 25 along the slot 28, the cross-sectional dimension of the tab 25 being greater than the width of the slot 28. To this end, the relative dimensions of the aperture 27, the slot 28, the bead 21 and the portion of the cable 20 adjacent the bead 21 are such that the bead 21 and the cable 20 pass through the aperture 27 upon longitudinal movement of the cable 20 and the bead 21 during reception of the bead 21 into the opening 26, the portion of the cable 20 adjacent the bead 21 is received within the slot 28 upon subsequent lateral movement of the cable 20 from the aperture 27 into the slot 28, and the bead 21 is precluded from passing longitudinally through the slot 28 upon the reception of the adjacent portion of the cable 20 in the slot 21.

Adjustable suspension support 10 now is ready to support railroad brake coupling member 12 which extends outwardly from a railroad car, as described above. In a manner similar to the connection of cable 20 to overhead support 11, the other end, or lower end of cable 20 is attached to railroad brake hose coupling member 12. Specifically, bead 21 at the second or lower end of cable 20 is inserted through a boss or other support 34 on railroad brake hose coupling member 12 and is pulled toward the intermediate receivers 22 on cable 20, forming a lower loop 36 in cable 20. The pulling movement raises railroad brake hose coupling member 12 upward away from the ground beneath both the coupling member 12 and the railroad car from which the member 12 extends. Once the railroad brake hose coupling member 12 is located at a sufficient selected height above the ground, which must be at least the minimum of four inches required by federal law, bead 21 at the lower end of cable 20 may be captured within one of the intermediate receivers 22. Thus, the closest receiver 22 is selected, and bead 21 is inserted into keyhole-shaped opening 26, via circular aperture 27 in the tab 25 of the selected receiver 22. The portion of the cable 20 adjacent the bead 21 at the lower end of the cable 20 then is allowed to slide laterally into elongate slot 28, the bead 21 and the portion of the cable 20 adjacent the bead 21 being biased downwardly by the weight of the railroad brake hose coupling member 12, thereby capturing the bead 21 and the cable 20 within the selected receiver 22. Since all of receivers 22 are permanently affixed to cable 20, such as by crimping of ferrule 23 onto the cable 20, or by welding of the ferrule 23 to the cable 20, once bead 21 is pulled tightly into engagement with tab 25, at slot 28, the railroad brake hose coupling member 12 is reliably suspended from overhead support 11.

The alignment of the longitudinal axis L of cable 20 with slot 28, as shown in FIG. 4, serves to deter inadvertent dislodgement of bead 21 from the opening 26 should bead 21 tend to ride upward in tab 25 towards circular aperture 27. More specifically, the weight of railroad brake hose coupling member 12, as supported by cable 20, holds cable 20 taut and tightly against the back of tab 25, juxtaposed with the slot 28, as shown in FIG. 4. This additional security feature functions to prevent accidental disconnection of each of the ends of the adjustable suspension support 10, thereby preventing railroad brake hose coupling member 12 from dropping and potentially contacting the ground, which could result in damage to railroad brake hose coupling member 12, as well as disconnection of railroad brake hose coupling member 12 from an adjacent coupling member on an adjacent railroad car, which could have disastrous consequences or, at a minimum, could cause an emergency stopping of the entire train or, at a maximum, could cause derailment of one or more cars on the train due to a failed connection or to sudden emergency braking, which could result in both personal and property damage.

Adjustable suspension support 10 easily is adjustable or removable should railroad brake hose coupling member 12 need to be raised or lowered, or even removed from the railroad car. The adjustment or removal process merely requires the lifting of railroad brake hose coupling member 12 in the general direction of overhead support 11. This relieves the tautness from cable 20 so as to allow either or both of the beads 21 to be moved in the direction generally toward one another and thus toward the circular aperture 27 within the corresponding opening 26, whereby bead 21 may be removed from the corresponding tab 25.

Accordingly, the improved adjustable suspension support 10 is simplified, provides an effective, safe, relatively inexpensive and efficient device which achieves all of the objects and advantages outlined above, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension support is constructed, and used in connection with a brake hose coupling member, as well as in other uses, the characteristics of the construction and use, and the advantageous, new and useful results obtained, the new and useful structures, devices, elements, arrangements, parts and combinations, are set forth in the appended claims.

The embodiments of the invention in which an exclusive property or privilege is claimed are defined as follows:

1. A selectively adjustable suspension support for suspending a supported member from an overhead support member at a selected distance below the overhead support member, the adjustable suspension support comprising:

an elongate flexible suspension member having a longitudinal length extending between a first end and a second end;

a retainer affixed to the suspension member adjacent each of to the first end and the second end; and a plurality of separate, discrete receivers affixed to the suspension member, spaced apart along the length of the suspension member, each receiver including a catch for receiving and capturing one of the retainers in the receiver, whereby capture of the one retainer within a selected receiver establishes the distance between the overhead support member and the supported member.

2. The adjustable suspension support of claim 1 wherein:

each retainer includes a bead secured to the suspension member;

each receiver includes a tab and a connector securing the tab to the suspension member; and each catch includes an opening in the tab, the opening having an insertion portion for reception of one of the beads into the opening in the tab of a selected receiver. and a securement portion for capturing the one of the beads against inadvertent release from the selected receiver.

3. The adjustable suspension support of claim 2 wherein:

the insertion portion includes an aperture in the tab; and the securement portion includes a slot communicating with the aperture;

the relative dimensions of the aperture, the slot, the suspension member and the one bead being such that the bead and the suspension member pass through the aperture upon longitudinal movement of the suspension member during reception of the one bead into the opening, the suspension member is received within the slot upon subsequent lateral movement of the suspension member from the aperture into the slot, and the bead is precluded from passing longitudinally through the slot upon the reception of the suspension member in the slot.

4. The adjustable suspension support of claim 3 wherein:

the orientation of the opening in the tab of the receiver located adjacent the first end of the suspension member is such that the slot extends from the aperture toward the first end of the suspension member; and the orientation of the opening in the tab of the receiver located adjacent the second end of the suspension member is such that the slot extends from the aperture toward the second end of the suspension member.

5. The adjustable suspension support of claim 4 wherein the first end of the suspension member is an upper end, the second end of the suspension member is a lower end, the receiver located adjacent the first end is an uppermost receiver, the receiver located adjacent the second end is a lowermost receiver, and the orientation of the opening in the tab of each of the receivers located between the uppermost receiver and the lowermost receiver is such that the slot extends from the aperture toward the second end of the suspension member.

6. The adjustable suspension support of claim 4 wherein the opening in each of the tabs has a generally keyhole-shaped configuration.

7. The adjustable suspension support of claim 4 wherein the suspension member includes a longitudinal axis extending along the suspension member between the first and second ends, and the slot in each tab is aligned with the longitudinal axis of the suspension member such that the suspension member is juxtaposed with the slot of each tab for deterring inadvertent release of the bead from the opening when the supported member is suspended from the overhead support member.

8. The adjustable suspension support of claim 4 wherein the connector includes a ferrule integral with the tab, and the suspension member extends into the ferrule.

9. The adjustable suspension support of claim 8 wherein the ferrule is crimped to the suspension member.

10. The adjustable suspension support of claim 4 wherein the suspension member includes a stranded cable.

11. The adjustable suspension support of claim 4 wherein the suspension member includes a stranded cable and a coating of synthetic polymeric material on the cable.

12. A selectively adjustable suspension support for suspending a railroad brake hose and coupler from a railroad car at a selected distance below the railroad car, the adjustable suspension support comprising:

an elongate flexible cable having a longitudinal length extending between a first end and a second end;

a bead affixed to the suspension member adjacent each of the first end and the second end; and a plurality of separate, discrete tabs affixed to the cable, spaced apart along the length of the cable, each tab including a catch for receiving and capturing one of the beads in the tab, whereby capture of the one bead within a selected tab establishes the distance between the railroad car and the railroad brake hose and coupler.

13. The adjustable suspension support of claim 12 wherein each catch includes an opening in the tab, the opening having an insertion portion for reception of the one of the beads into the opening in a selected tab, and a securement portion for capturing the one of the beads against inadvertent release from the selected tab.

14. The adjustable suspension support of claim 13 wherein the insertion portion includes an aperture in the tab; and the securement portion includes a slot communicating with the aperture;

the relative dimensions of the aperture, the slot, the cable and the one bead being such that the bead and the cable pass through the aperture upon longitudinal movement of the cable during reception of the one bead into the opening, the cable is received within the slot upon subsequent lateral movement of the cable from the aperture into the slot, and the bead is precluded from passing longitudinally through the slot upon the reception of the cable in the slot.

15. The adjustable suspension support of claim 14 wherein:

the orientation of the opening in the tab located adjacent the first end of the cable is such that the slot extends from the aperture toward the first end of the cable; and the orientation of the opening in the tab located adjacent the second end of the cable is such that the slot extends from the aperture toward the second end of the cable.

16. The adjustable suspension support of claim 15 wherein the first end of the cable is an upper end, the second end of the cable is a lower end, the tab located adjacent the first end is an uppermost tab, the tab located adjacent the second end is a lowermost tab, and the orientation of the opening in each of the tabs located between the uppermost tab and the lowermost tab is such that the slot extends from the aperture toward the second end of the cable.

17. The adjustable suspension support of claim 16 wherein the opening in each of the tabs has a generally keyhole-shaped configuration.

18. The adjustable suspension support of claim 17 wherein the cable includes a longitudinal axis extending along the cable between the first and second ends, and the slot in each tab is aligned with the longitudinal axis of the cable such that the cable is juxtaposed with the slot of each tab for deterring inadvertent release of the one bead from the opening when the railroad brake and coupler is suspended from the railroad car.

19. A method of suspending a supported member from an overhead support member at a selected distance below the overhead support member, utilizing an elongate flexible cable having a length extending longitudinally between opposite ends, a bead affixed to the cable adjacent each of the opposite ends, and a plurality of separate, discrete tabs affixed to the cable, spaced apart along the length of the cable, each tab including an aperture and a slot communicating with the aperture, the method comprising:

passing one of the beads and a first portion of the cable adjacent the one bead through the aperture of a selected tab by longitudinal movement of the first portion of the cable through the aperture;

moving the first portion of the cable laterally from the aperture into the slot communicating with the aperture such that the first portion of the cable extends through the slot;

the relative dimensions of the aperture, the slot, the first portion of the cable and the one bead being such that the one bead and the first portion of the cable pass through the aperture upon longitudinal movement of the first portion of the cable during reception of the one bead into the opening, the first portion of the cable is received within the slot upon subsequent lateral movement of the first portion of the cable from the aperture into the slot, and the one bead is precluded from passing longitudinally through the slot upon the reception of the first portion of the cable in the slot for precluding inadvertent release of the one bead from the opening when the supported member is suspended from the overhead support member; and juxtaposing a further portion of the cable with the slot through which the first portion of the cable extends to deter inadvertent movement of the first portion of the cable laterally back into the aperture.

20. The method of claim 19 wherein the supported member is a railroad brake hose and coupler, and the overhead support member is a railroad car such that the method includes suspending the railroad brake hose and coupler from the railroad car at a selected distance below the railroad car.

* * * * *